United States Patent [19]
Chemla

[11] Patent Number: 5,805,403
[45] Date of Patent: Sep. 8, 1998

[54] INTEGRATED CIRCUIT TEMPERATURE MONITORING AND PROTECTION SYSTEM

[75] Inventor: Guy Chemla, Rosh Ha'ayin, Israel

[73] Assignee: 3Com Ltd., Tel-Aviv, Israel

[21] Appl. No.: 620,801

[22] Filed: Mar. 28, 1996

[51] Int. Cl.$^6$ ........................................ H02H 5/04
[52] U.S. Cl. .................... 361/103; 364/483; 364/557; 337/302
[58] Field of Search .............. 361/103; 257/467; 337/300–302, 303, 304; 364/490–491, 483, 557

[56] References Cited

U.S. PATENT DOCUMENTS

| 5,255,149 | 10/1993 | Matsuo | 361/103 |
| 5,502,838 | 3/1996 | Kikinis | 395/550 |
| 5,513,235 | 4/1996 | Douglass et al. | 377/25 |
| 5,585,995 | 12/1996 | Baurand et al. | 361/103 |

*Primary Examiner*—Brian K. Young
*Assistant Examiner*—Michael Sherry
*Attorney, Agent, or Firm*—Wilson Sonsini Goodrich & Rosati

[57] ABSTRACT

A system of monitoring and protecting integrated circuits against damage due to over temperature conditions functions to monitor the temperature of an IC and either shut down its input clock signal or assert its reset line if case temperatures rise to high. Heat dissipated by an integrated circuit is sensed by a temperature sensor. The temperature sensor is thermally coupled to the integrated circuit via thermal glue or other thermally conductive means. The output of temperature sensor is input to temperature sensor circuitry which converts the low level output of the temperature sensor into a signal that can be read by a processor. The processor is suitable programmed to monitor the output of temperature sensor circuitry. When the temperature of the integrated circuit rises past a predetermined threshold value, the processor outputs a control signal to the clock generator circuitry causing it to switch off its clock signal input by the integrated circuit or asserts the chips reset line. Either action should prevent any further temperature rise of the chip. Other embodiments include monitoring multitude integrated circuits and placing the sensing components within the chip itself. In addition, an embodiment is disclosed that utilizes the JTAG interface standard included in many integrated circuits to transmit temperature information to the processor. In addition, the present invention can be used to generate heat maps of circuit boards, useful during prototyping and in the management of real systems.

12 Claims, 4 Drawing Sheets

INTEGRATED CIRCUIT TEMPERATURE MONITORING AND PROTECTION SYSTEM

FIELD OF THE INVENTION

The present invention relates to a system for detecting the temperature condition of integrated circuits and in particular to a system for protecting integrated circuits (ICs) from damage caused by over temperature conditions.

BACKGROUND OF THE INVENTION

Integrated circuits (ICs) are continually playing more and more sophisticated roles in our lives. The number of devices, appliances and machines incorporating ICs is increasing at a faster and faster rate. In addition, the IC content of devices already incorporating IC technology is increasing. CMOS ICs, in particular are very popular due to their lower power consumption. However, even with increasing CMOS IC densities, heat dissipating eventually becomes a problem. The power dissipation in CMOS ICs is generally directly proportional to the clock frequency. As the clock frequency increases so does the power dissipation.

In addition, increasingly smaller transistor dimensions allow semiconductor manufacturers to pack more and more transistors into the same sized piece of real estate that once held a far fewer number of devices. Due to the large packing density of modern ICs, the heat dissipation problem is gaining more and more focus.

In response to this problem, semiconductor manufacturers have turned to lower supply voltages in order to lower the voltage/current (VI) power consumption. At the board level, mechanical solutions have been offered which include better enclosure design incorporating strategic placement of one or more cooling fans. Forced air cooling systems are designed to forcibly circulate air over ICs keeping them from overheating. These designs and other cooling system designs as well, suffer from several potential problems. One problem is that the systems may be inadvertently shut down. This may be due to mechanical or human error. Another problem is that one or more components within the cooling system may fail. Cooling fans may fail causing the temperature of the ICs to rise. If the temperature rises too much, the ICs will, in the best case simply fall and the worst case, they may pose a risk of fire, which, in addition to other effects, may cause de-soldering of the integrated circuits and other components. In addition, extremely high IC temperatures may cause permanent damage to the ICs, potentially making the failure of a low cost cooling fan a very expensive failure if numerous expensive ICs are involved.

At the board level, other solutions include the use of electronic temperature controlled fuses that switch off the supply voltage feeding the IC, in order to lower power consumption and subsequently IC temperature. Similar mechanisms at the IC chip level also exist that operate to shut off the power to the IC. A disadvantage of these temperature reducing techniques is that they require numerous components and are relatively overly complex in comparison to their required task.

SUMMARY OF THE INVENTION

Accordingly, it is an object of the present invention to provide an integrated circuit temperature monitoring system that can be used to both monitor and protect integrated circuits from over temperature conditions and that avoids the problems of the prior art.

Another object of the present invention is to provide an integrated circuit temperature monitoring and protection system that does not operate by disconnecting the supply voltage from an IC.

It is another object of the present invention to provide an integrated circuit temperature monitoring and protection system that can be adapted to operate at the board level and/or at the IC chip level.

Thus, there is provided in accordance with a preferred embodiment of the present invention a system of monitoring the temperature of an integrated circuit, the system including a temperature sensor thermally coupled to the integrated circuit, temperature sensor circuitry coupled to temperature sensor, the temperature sensor circuitry operative to generate a signal in proportion to the temperature of the integrated circuit, and a processor coupled to the temperature sensor circuitry, the processor operative to monitor the output of the temperature sensor circuitry.

The system also includes means of halting a clock signal coupled to the integrated circuit, the means responsive to a command issued by the processor upon the temperature of the integrated circuit rising above a predetermined threshold level, the means protecting the integrated circuit from damage due to an over temperature condition.

In addition, the system includes means of asserting a reset signal, the reset signal output from the processor and input to the integrated circuit, the means reset signal being asserted upon the temperature of the integrated circuit rising above a predetermined threshold level, the means protecting the integrated circuit from damage due to an over temperature condition.

There is also provided, in accordance with a preferred embodiment of the present invention, a system of monitoring the temperature of an integrated circuit, the system situated within the integrated circuit, the system includes a switch having an input, an output and a control input, a temperature sensor thermally coupled to the integrated circuit, temperature sensor circuitry coupled to temperature sensor, the temperature sensor circuitry operative to generate a signal in proportion to the temperature of the integrated circuit, clock control circuitry coupled to the temperature sensor circuitry the clock circuitry operative to monitor the output of the temperature sensor circuitry, and wherein the switch is responsive to a command issued by the clock control circuitry upon the temperature of the integrated circuit rising above a predetermined threshold level.

The clock control circuitry generates an over temperature output signal and the temperature sensor and the temperature sensor circuitry are situated within the integrated circuit.

Also provided in accordance with a preferred embodiment of the present invention is a system of monitoring the temperature of a plurality of integrated circuits, coupled together in cascaded fashion, the system includes a temperature sensor internal to the integrated circuit, temperature sensor circuitry coupled to temperature sensor, the temperature sensor circuitry internal to the integrated circuitry and operative to generate a signal in proportion to the temperature of the integrated circuit, JTAG interface circuitry having an input and an output, the output of an integrated circuit coupled to the input of the following downstream integrated circuit, and a processor coupled to the input of the first integrated circuit and to the output of the last integrated circuit, the processor, through the JTAG interface, operative to monitor the output of the temperature sensor circuitry.

The system also includes means of halting a clock signal input to the plurality of integrated circuits, the means responsive to a command issued by the processor upon the temperature of the integrated circuit rising above a predetermined threshold level.

There is also provided a method of monitoring the temperature of an integrated circuit, the method includes the steps of sensing the temperature of the integrated circuit, generating a signal in proportion to the temperature of the integrated circuit, monitoring the signal and comparing it to a predetermined threshold level, and activating means for reducing the temperature of the integrated circuit.

The step of activating includes halting a clock signal input to the integrated circuit in response to the level of the signal exceeding the predetermined threshold level. The step of activating may alternatively include asserting a reset signal input to the integrated circuit.

BRIEF DESCRIPTION OF THE DRAWINGS

The invention is herein described, by way of example only, with reference to the accompanying drawings, wherein.

DETAILED DESCRIPTION OF THE INVENTION

Figure 1:
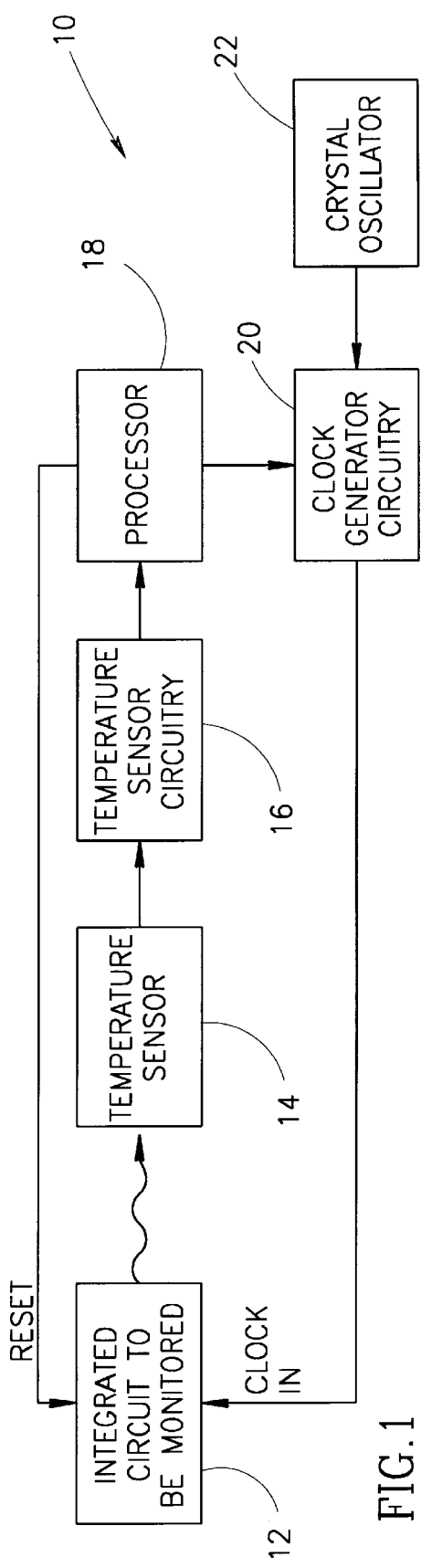
FIG. 1 is a high level block diagram illustrating the temperature monitoring and protection system of the present invention applied to an integrated circuit.

A high level block diagram illustrating the temperature monitoring and protection system of the present invention, generally referenced 10, as applied to an integrated circuit is shown in FIG. 1. As discussed above, it is desirable to protect ICs from temperature related damage. The present invention achieves this goal by monitoring the temperature of an IC and if the temperature rises too high, either the clock signal to the chip is halted or the chip's reset line is held active. Monitoring by itself is useful as a prototyping tool. It can be used to develop a heat map of a circuit board, allowing for better placement of integrated circuit components and/or cooling fans. In addition, monitoring of actual production systems is also useful in the real time management of these systems. A heat image of a system can be displayed on an attached console. Such an image would show the temperatures in various zones of the card, box, cage or other type of system enclosure.

Illustrated in FIG. 1 are the basic elements needed to perform this function. Clock generator circuitry 20 provides the clock signal for the integrated circuit to be monitored 12. In a preferred embodiment, clock generator circuitry 20 can accepts an input signal to control the output of the clock signal. A switching function is performed allowing an external device to switch the clock output signal on and off. This functionality may be provided by alternative means such as a conventional clock generator coupled to a discrete switch. The discrete switch may be of a mechanical or electrical type. Mechanical switches include mechanical relays, etc. Electrical switches include any type of semiconductor switch such as FETs, MOSFETs, IGBTs, etc.

Depending on clock generator circuitry 20, a crystal oscillator 22 may be required to provide the base frequency source. The type of clock generator employed in the circuit is not important to the operation of the invention. Any clock source whose output clock signal can be switched on and off will operate with the present invention.

Heat dissipated by IC 12 is sensed by temperature sensor 14. Preferably temperature sensor 14 is thermally coupled to IC 12 via thermal glue or other thermally conductive means. The output of temperature sensor 14 is input to temperature sensor circuitry 16 which converts the low level output of temperature sensor 14 into a signal that can be read by a processor 18. Processor 18 may be any suitable control logic or combination hardware/software controller. Processor 18 is suitably constructed and/or programmed to monitor the output of temperature sensor circuitry 16. The monitoring can be performed on a periodic or continuous basis. If protection against over temperature conditions is desired, then when the temperature of IC 12 rises past a predetermined threshold value, processor 18 outputs a control signal to clock generator circuitry 20 causing it to switch off its output clock signal to IC 12. The removal of the clock signal from IC 12 should prevent any further temperature rise of the chip. In addition, processor 18 can be programmed to transmit an over temperature message or signal to some other component or system (not shown), such as a host computer or other monitoring device.

Alternatively, processor 18 can assert the reset line to IC 12 forcing the IC into a reset mode, thus reducing the activity of the chip. The IC can be kept in reset until, for example, the condition causing the temperature rise is corrected. Typically, processor 18 would not perform both actions. In this embodiment and in the embodiments described below, an over temperature condition would either trigger the halting of the clock or an assertion of the reset to the chip.

The IC protection system of the present invention may be applied externally to ICs on a board level basis or can be incorporated directly within the IC itself. Both embodiments are disclosed below.

Figure 2:
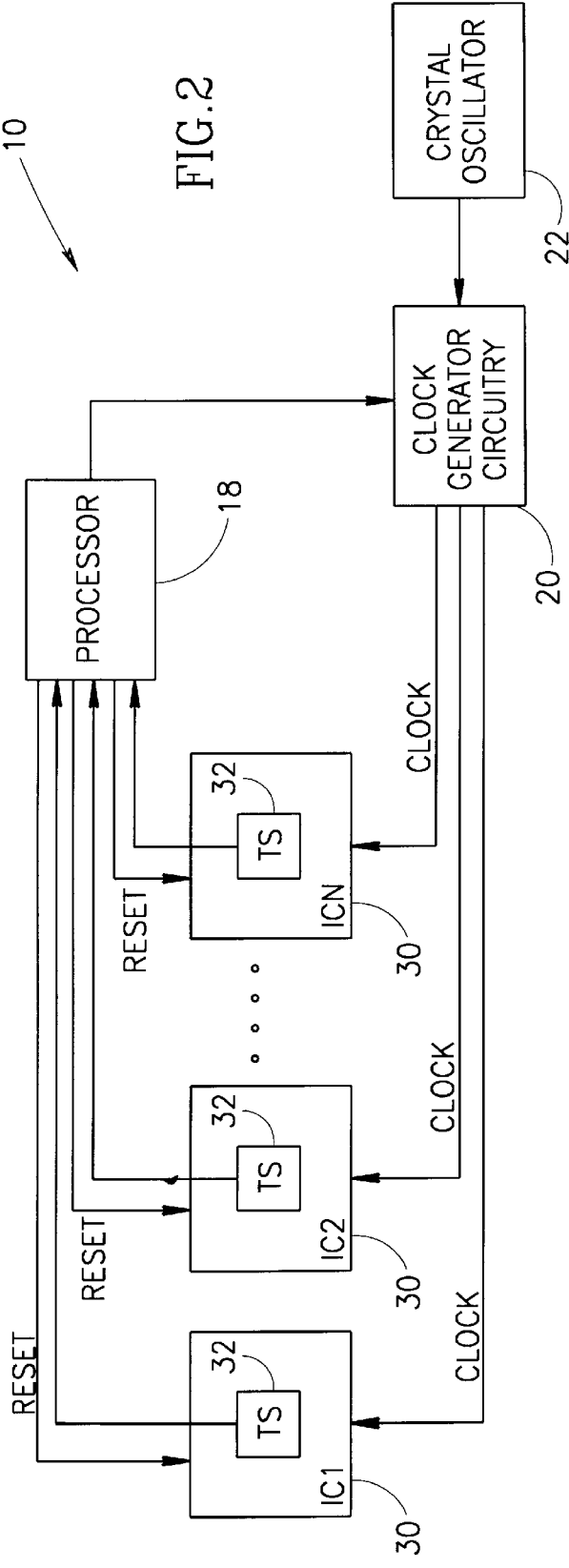
FIG. 2 is a high level block diagram illustrating the temperature monitoring and protection system of the present invention applied to a plurality of integrated circuits located on a printed circuit board, each integrated circuit having an external temperature sensor.

A high level block diagram illustrating the temperature monitoring and protection system of the present invention applied to a plurality of integrated circuits located on a printed circuit board, wherein each integrated circuit having an external temperature sensor is shown in FIG. 2. In this embodiment, multiple ICs 30, labeled IC1, IC2 . . . ICN, each have a temperature sensor (TS) 32 thermally coupled to them. Each TS incorporates a temperature sensor and associated circuitry necessary to output a signal readable by processor 18. The output of each TS is input to processor 18. Processor 18 also generates a reset line for each integrated circuit. Alternatively, the reset lines can be shared as one common line. Heat given off by each IC is sensed by TS 32 and a signal proportional to the temperature is input to processor 18. Processor 18 receives as input the outputs of each TS 32. Processor 18 is suitably programmed to monitor each TS. If over temperature protection is desired then when the temperature of any of the ICs exceed a predetermined temperature, processor 18 is operative to shut down the clock signal output from the clock generator circuitry 20. Alternatively, processor 18 is operative to hold the integrated circuit in reset. If required, crystal oscillator 22 provides the raw frequency source for clock generator circuitry 20.

As an example, with reference to FIG. 2, processor 18 may be a 3048 microcontroller manufactured by Hitachi. The AD22103 temperature sensor manufactured by Analog Devices may be used for temperature sensors 32. The temperature sensors are connected to each IC using heat conductive glue. The voltage output of each TS 32 is proportional to the case temperature of the IC and enters one of the analog inputs of processor 18. Clock generator circuitry 20 may be an ICS9176 manufactured by Integrated Circuit Systems, Inc. Processor 18 programs the clock generator circuitry to halt the clock signal thereby reducing the power consumption of the IC.

Figure 3:
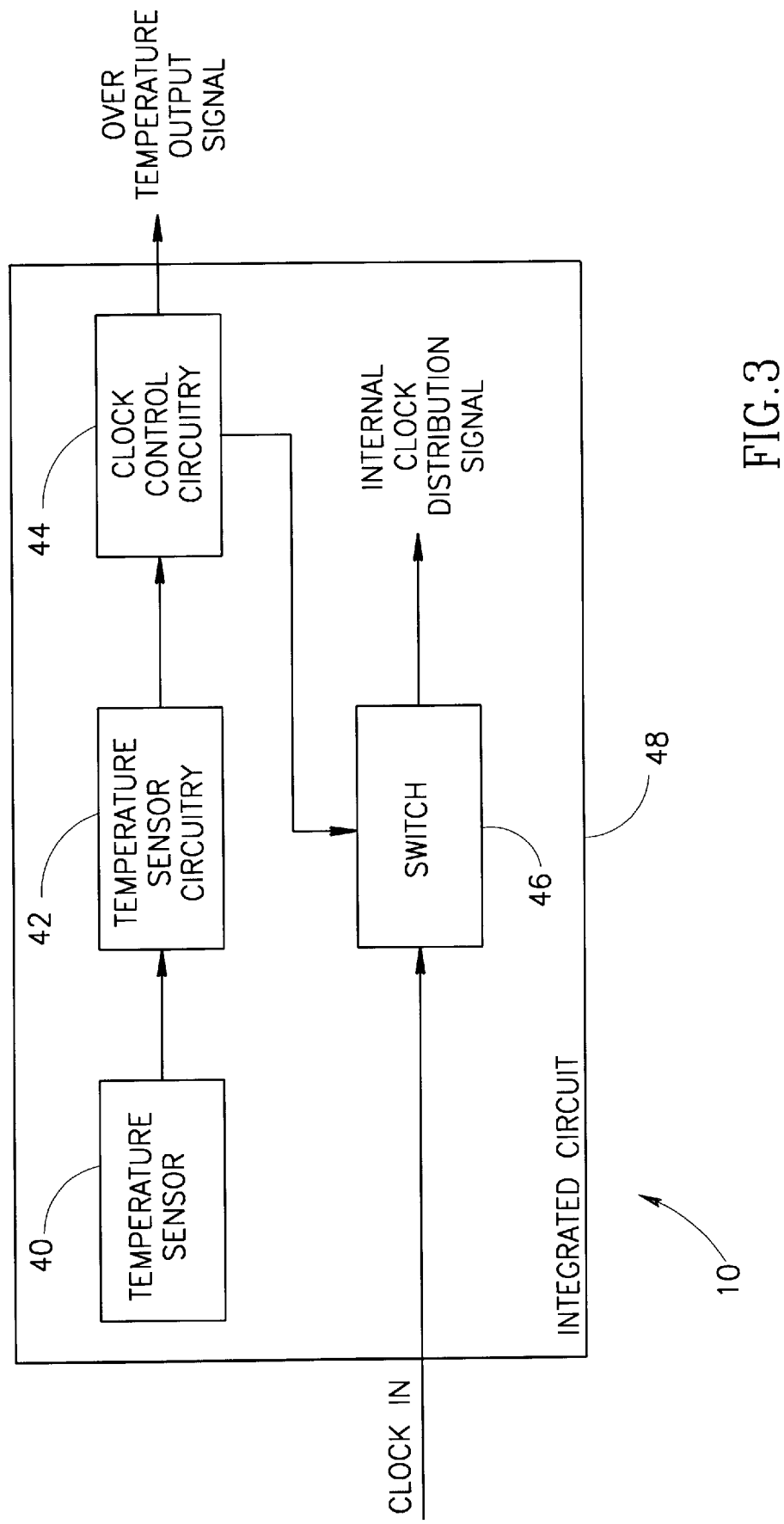
FIG. 3 is a high level block diagram illustrating the temperature monitoring and protection system of the present invention built self contained within the integrated circuit itself.

A high level block diagram illustrating the temperature protection system 10 of the present invention built so as to be completely self contained within the integrated circuit itself is shown in FIG. 3. Integrated Circuit 48 receives a clock in signal that is input to a switch 46. Normally switch 46 is in the closed state, allowing the input signal to pass to the output. The output being the internal clock distribution signal. Temperature sensor 40 operates similarly to the temperature sensors of FIGS. 1 and 2, however is integral to IC 48. Temperature sensor 48 may reside on the actual silicon or be thermally connected to the case or cover of IC 48. The output of temperature sensor 40 is input to temperature sensor circuitry 42. Temperature sensor circuitry 42 functions to generate a voltage proportional to the case of die temperature of IC 48. The output of temperature sensor circuitry 42 is input to clock control circuitry 44. Clock control circuitry functions to monitor the output voltage from temperature sensor circuitry 42 and, upon exceeding a preset threshold temperature (i.e., voltage), is operative to open switch 46 thus reducing the power consumption of IC 48. In addition clock control circuitry can optionally generate an over temperature output signal that can be detected by other monitoring equipment or devices. Such a signal could be used to generate a message or an alarm to alert technicians or maintenance of the existence of an over temperature condition.

Figure 4:
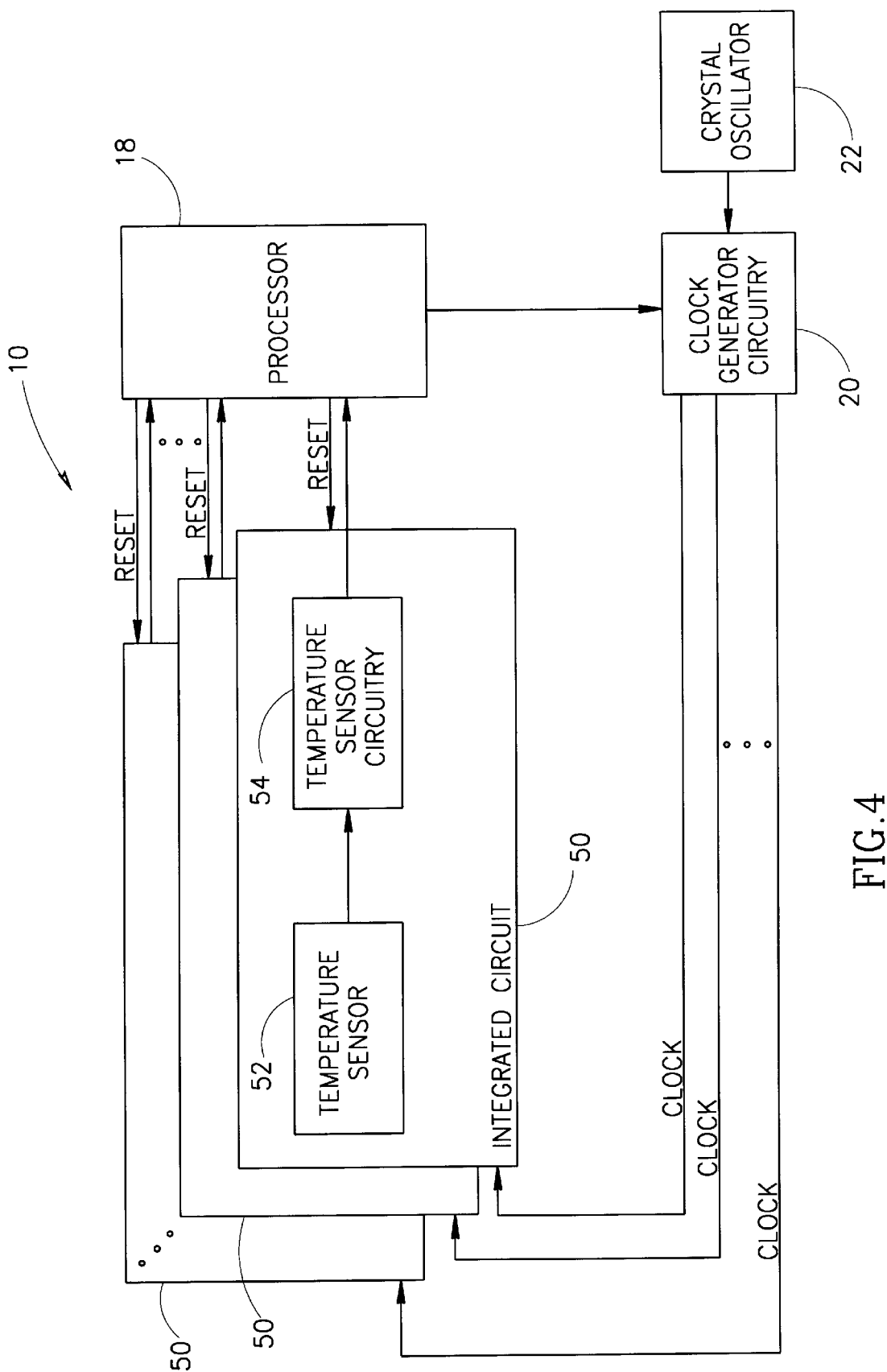
FIG. 4 is a high level block diagram illustrating the temperature monitoring protection system of the present invention applied to a plurality of integrated circuits located on a printed circuit board, each integrated circuit having an internal temperature sensor.

A high level block diagram illustrating the temperature monitoring and protection system 10 of the present invention applied to a plurality of integrated circuits located on a printed circuit board, each integrated circuit having an internal temperature sensor is shown in FIG. 4. In this embodiment each IC 50 has an onboard temperature sensor 52 and temperature sensor circuitry 54. Clock generator circuitry 20 generates clock signals for the integrated circuits. Processor 18 generates the reset signals input to each integrated circuit, or in the alternative, generates a common reset shared by all integrated circuits. As in the embodiments discussed previously, temperature sensor 52 senses the case temperature of IC 50. Temperature sensor circuitry 54 generates a voltage proportional to the temperature sensed by temperature sensor 52. The output of the temperature sensor circuitry 54 within each IC 50 is input to an analog input of processor 18. As in the previous embodiment, processor 18 is suitably programmed to signal clock generator to halt its output clock signal when the sensed temperature exceeds a preset threshold. As an alternative processor 18 is suitably programmed to assert the reset line forcing the integrated circuit to reduce its activities, thus cooling the chip.

Figure 5:
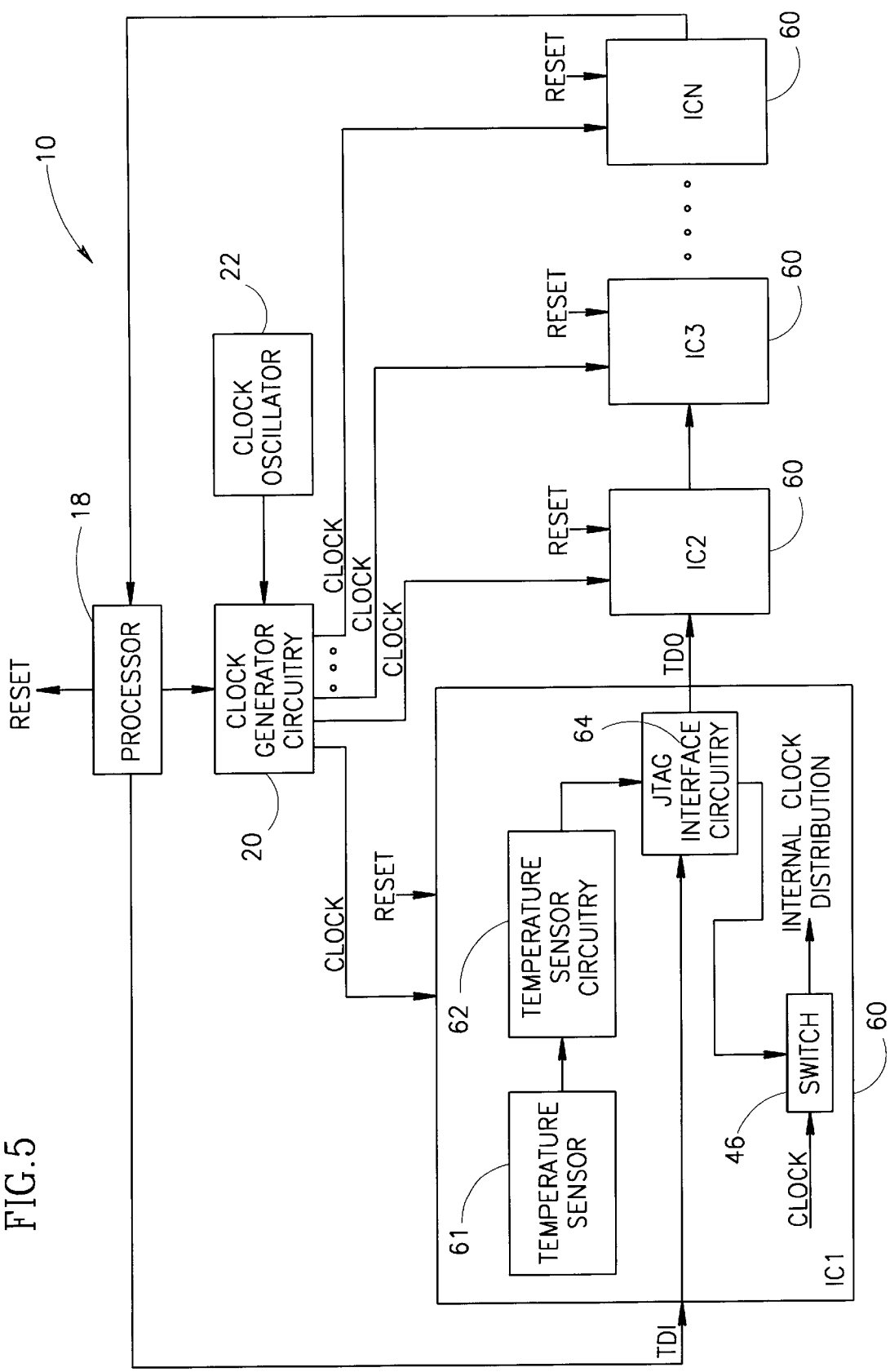
FIG. 5 is a high level block diagram illustrating the temperature monitoring and protection system of the present invention applied to a plurality of integrated circuits located on a printed circuit board, each integrated circuit having a JTAG interface.

A high level block diagram illustrating the temperature monitoring and protection system 10 of the present invention applied to a plurality of integrated circuits located on a printed circuit board, wherein each integrated circuit has a JTAG interface is shown in FIG. 5. Each IC 60 comprises a temperature sensor 61, temperature sensor circuitry 62 and JTAG interface circuitry 64. Clock generator circuit generates clock signals input to each integrated circuit. Processor generates the reset signal for each integrated circuit.

JTAG is defined in IEEE standard 1149 and is a technique of testing multiple ICs using a serial bit stream. Each JTAG device is cascadeable and individually addressable. It can be used to test a circuit board without requiring the need for the conventional test bed of nails. Currently, many devices are being designed to be JTAG compliant. In addition, the JTAG interface on many device are being used for functions other than testing, such as, initialization, in system programming of programmable devices, etc. The present invention adds another function to JTAG interface. It can be used to report the temperature of the IC and/or report the existence of an over temperature condition.

JTAG compatible devices on a circuit board are typically cascaded together. The test data out (TDO) pin is connected to the test data in (TDI) pin of the next downstream device. Referring to FIG. 5, each of the ICs 60, i.e., IC1, IC2 . . . ICN, have their TDO pin connected to the TDI pin of the next IC. In FIG. 5, IC1, shown in detail, is representative of all ICs 60. Clock generator circuitry 20, optionally utilizing crystal oscillator 22, supplies the clock in signals to each IC 60, IC1 to ICN. Internally, to IC 60, is a switch 46 which normally passes the input clock signal to the internal clock distribution network inside the chip.

An output from processor 18 is coupled to the TDI of IC1. Processor 18 generates a JTAG compliant message which is transmitted to IC1 on its TDI input. The message polls each IC for its temperature. Any IC reporting temperatures over a threshold can have its clock halted. Alternatively, all integrated circuits can have their clocks halted, not just the offending chip. Processor 18 sends a command or control signal to clock generator circuitry 20 which halts the clock input signals to ICs 60. Alternatively, the processor can issue a JTAG instruction to JTAG interface circuitry 64 instructing it to open switch 46. As in the embodiments disclosed above, processor 18 can hold the integrated circuits in reset, either directly or via a JTAG instruction, reducing their activity and subsequently their temperature. As an alternative to reporting the actual temperature, each IC can give a binary indication of whether an over temperature condition exists, using the JTAG protocol.

As described earlier, monitoring by itself is useful as a prototyping tool. Monitoring can be used to generate a heat map of a circuit board, allowing for better placement of integrated circuit components and cooling fans. In addition, monitoring actual production systems is also useful for real time management of these systems. A heat image of a system can be displayed on an attached management console. Such an image would show the temperature in various zones of the card, box, cage or other type of system enclosure.

To reduce the amount of silicon real estate needed for the temperature sensor and temperature sensor circuitry, the successive approximation register and associated control logic normally found in analog to digital converters (A/Ds) could be implemented in the processor or hardware/software controller, leaving only the resistor ladder and the analog comparator in the integrated circuit. The processor or hardware/software controller would shift the new approximation of the conversion into the TDI pin and the integrated circuit would shift out from the TDO pin, an above or below indication resulting from the analog comparison of the analog conversion of the shifted digital word to the analog representation on the sensed temperature.

While the invention has been described with respect to a limited number of embodiments, it will be appreciated that many variations, modifications and other applications of the invention may be made.

What is claimed is:

1. A system of monitoring the temperature of an integrated circuit, the system comprising:

a temperature sensor thermally coupled to said integrated circuit;

temperature sensor circuitry coupled to said temperature sensor, said temperature sensor circuitry operative to generate a signal in proportion to the temperature of said integrated circuit;

a processor coupled to said temperature sensor circuitry, said processor operative to monitor the output of said temperature sensor circuitry; and means for holding the integrated circuit in reset, the integrated circuit being held in reset upon the temperature of said integrated circuit exceeding a predetermined threshold level thus protecting said integrated circuit from damage due to an over temperature condition.

2. The system according to claim 1, wherein said temperature sensor is coupled to said temperature sensor circuitry using thermally conductive glue.

3. The system according to claim 1, wherein said temperature sensor is integral with said temperature sensor circuitry.

4. A system of monitoring the temperature of an integrated circuit, said system situated within said integrated circuit, the system comprising:

a switch having an input, an output and a control input;

a temperature sensor thermally coupled to said integrated circuit;

temperature sensor circuitry coupled to said temperature sensor, said temperature sensor circuitry operative to generate a signal in proportion to the temperature of said integrated circuit;

clock control circuitry coupled to said temperature sensor circuitry, said clock control circuitry operative to monitor the output of said temperature sensor circuitry; and wherein said switch is responsive to a command issued by said clock control circuitry upon the temperature of said integrated circuit rising above a predetermined threshold level.

5. The system according to claim 4, wherein said clock circuitry generates an over temperature output signal.

6. The system according to claim 4, wherein said temperature sensor and said temperature sensor circuitry are situated within said integrated circuit.

7. A system for monitoring the temperature of a plurality of integrated circuits, coupled together in cascaded fashion including a first integrated circuit and a last integrated circuit, the system comprising:

a temperature sensor internal to said integrated circuit;

temperature sensor circuitry coupled to said temperature sensor, said temperature sensor circuitry internal to each integrated circuit and operative to generate a signal in proportion to the temperature thereof;

JTAG interface circuitry within each integrated circuit, said JTAG interface circuitry having an input and an output, the output of said JTAG interface circuitry within each integrated circuit coupled to the input to said JTAG interface circuitry in an integrated circuit located downstream therefrom; and a processor coupled to the input to said JTAG interface circuitry of the first integrated circuit and to the output of said JTAG interface circuitry of the last integrated circuit, said processor operative to monitor the output of said temperature sensor circuitry utilizing said JTAG interface circuitry in each integrated circuit.

8. The system according to claim 7, further comprising means of halting a clock signal input to said plurality of integrated circuits, said means of halting a clock signal responsive to a command issued by said processor upon the temperature of said plurality of integrated circuits, either singly or in combination, rising above a predetermined threshold level.

9. The system according to claim 7, further comprising means of holding said plurality of integrated circuit in reset, either singly or in combination, said means of holding said plurality of integrated circuit in reset responsive to a command issued by said processor upon the temperature of said plurality of integrated circuits, either singly or in combination, rising above a predetermined threshold level.

10. A method of monitoring the temperature of an integrated circuit, the method comprising the steps of:

providing a switch for controlling the distribution of a clock signal to the integrated circuit, said switch responsive to a command to either open or close;

sensing the temperature of said integrated circuit;

generating a signal in proportion to said temperature of said integrated circuit;

monitoring said signal and comparing it to a predetermined threshold level; and generating a command to open said switch when said signal exceeds said predetermined threshold level thus stopping the clock to the integrated circuit.

11. A system of monitoring the temperature of an integrated circuit, the system comprising:

a temperature sensor thermally coupled to said integrated circuit;

temperature sensor circuitry coupled to said temperature sensor, said temperature sensor circuitry operative to generate a signal in proportion to the temperature of said integrated circuit;

a processor coupled to said temperature sensor circuitry, said processor operative to monitor the output of said temperature sensor circuitry; and means for halting a clock signal coupled to the integrated circuit, said means responsive to a command issued by said processor upon the temperature of the integrated circuit exceeding a predetermined threshold level thus protecting said integrated circuit from damage due to an over temperature condition.

12. A method of monitoring the temperature of an integrated circuit, the method comprising the steps of:

sensing the temperature of said integrated circuit;

generating a signal in proportion to said temperature of said integrated circuit;

monitoring said signal and comparing it to a predetermined threshold level; and holding the integrated circuit in reset upon said signal exceeding said predetermined threshold thus greatly reducing heat generating activity of the integrated circuit.

* * * * *